Oct. 4, 1932.　　　L. M. WOOLSON　　　1,880,643
INTERNAL COMBUSTION ENGINE
Filed Jan. 2, 1930
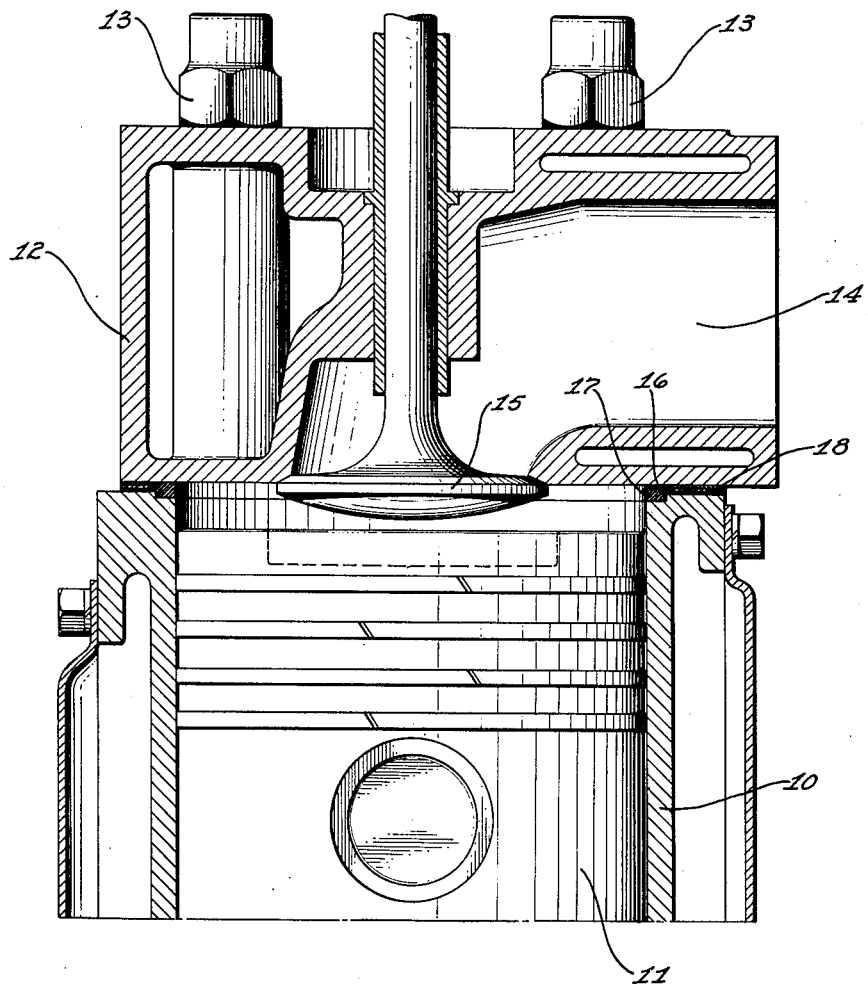
Inventor
LIONEL M. WOOLSON
By
Attorney Patented Oct. 4, 1932

1,880,643

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed January 2, 1930. Serial No. 417,967.

This invention relates to internal combustion engines and more particularly to sealing a cylinder head with the cylinder of an engine.

It is the usual practice to insert a compressible gasket between a cylinder and its head, and to draw the head against the gasket by nuts which are associated with studs projecting from the cylinder and passing through the head. When high compression pressure is employed in the cylinder, for example, similar to that developed by Diesel engines, the force will sometimes move the gasket outwardly from between the head and the cylinder, and then again it will distort the gasket sufficiently to permit leakage between the head and the cylinder. The loss of compression or the fuel charge results in inefficiency or engine failure, and an object of this invention is to provide a sealing arrangement for a cylinder head which will withstand any tendency of forces in the cylinder to distort or displace the gasket from leak proof relation.

Another object of the invention is to provide a novel form of pilot for an engine cylinder head gasket.

A further object of the invention is to provide an engine cylinder head gasket which is seated in a manner such that it cannot be displaced by compression pressure.

Still another object is to provide an engine head sealing arrangement which includes nested gaskets which can be readily placed and retained in their proper relation on the cylinder.

These and other objects of the invention will appear from the following description taken in connection with the drawing, which forms a part of this specification, and in which is illustrated a fragmentary sectional view of an engine cylinder and head.

Referring to the drawing by characters of reference, 10 illustrates a cylinder of an internal combustion engine in which the piston 11 is reciprocated. A head 12 is arranged to cover the end of the cylinder and is secured by the bolts 13 which extend through the cylinder and are anchored to the crank case (not shown). The head is provided with an exhaust passage 14 which is controlled by the valve 15. Another similar passage and valve (not shown) are arranged in the head for admitting an air charge into the cylinder.

The engine illustrated is of the four-cycle type and operates in accordance with the Diesel principle, however, the invention can be associated with engines operating with a different cycle and principle.

The end of the cylinder is provided with a circular counterbore 16 for the reception of a circular gasket 17 which is formed of copper, or some similar material, the gasket being of such a thickness that it projects beyond the end of the cylinder when seated in the counterbore. Another gasket 18 encircles the gasket 17 and is piloted thereby, such gasket seating against the end of the cylinder and being formed preferably of sheets of copper and an intermediate layer of asbestos. The gasket 18 is of a thickness such that it will normally project beyond the copper gasket, however, it can be more readily compressed than the copper gasket.

The head of the cylinder is drawn against the gaskets, and due to the seating arrangement of the gasket 17 pressure within the cylinder cannot displace the same laterally. The gasket 17 protects the laminated gasket 18 so that pressure within the cylinder will exert very little force thereagainst tending to laterally displace the same, and there can be no leakage into the cylinder through the gaskets.

The nested gasket arrangement is piloted so that it cannot be displaced by pressure, and can be readily associated in proper relation on the cylinder head.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In an engine, a cylinder having a recess in its end, a metal gasket seated in the recess and projecting beyond the cylinder end, another gasket closely encircling the metal gasket and seated against the end of the cylinder, and a head secured to the cylinder in a compression relation with the gaskets.

2. In an engine, a cylinder having a circular recess in its end, a head, and a pair of closely nested gaskets intermediate the cylinder and head, one of the gaskets being seated in the recess in the cylinder.

3. In an engine, a cylinder having a recess around its end, a head, and a pair of gaskets intermediate the head and the cylinder, one of said gaskets being seated in the recess in the cylinder end and piloting the other gasket.

4. In an engine, a cylinder having the end counterbored at the interior, a metal gasket seated in the counterbored portion of the cylinder and projecting beyond the end thereof, a laminated gasket encircling the metal gasket in close proximity thereto, and a head secured to the cylinder in compression relation against the gaskets.

5. In an engine, the combination of an open-ended cylinder, a head secured over the end of the cylinder, one of said parts being formed with a counterbore, a metal gasket seated in the counterbore and projecting beyond the counterbored portion, and a second gasket arranged between the cylinder and head and formed to be more readily compressible than the metal gasket and piloted by the metal gasket.

In testimony whereof I affix my signature.

LIONEL M. WOOLSON.